(12) United States Patent
Inoa

(10) Patent No.: US 12,082,563 B2
(45) Date of Patent: Sep. 10, 2024

(54) AUTOMATED TERRARIUM FEEDER ASSEMBLY

(71) Applicant: Ariel Inoa, Fresh Meadows, NY (US)

(72) Inventor: Ariel Inoa, Fresh Meadows, NY (US)

( * ) Notice: Subject to any disclaimer, the term of this patent is extended or adjusted under 35 U.S.C. 154(b) by 98 days.

(21) Appl. No.: 17/961,384

(22) Filed: Oct. 6, 2022

(65) Prior Publication Data

US 2024/0114881 A1 Apr. 11, 2024

(51) Int. Cl.
  *A01K 5/02* (2006.01)
  *A01K 63/06* (2006.01)
  *F21V 23/04* (2006.01)
  *F21W 131/308* (2006.01)

(52) U.S. Cl.
  CPC .......... *A01K 5/0291* (2013.01); *A01K 63/065* (2013.01); *F21V 23/0485* (2013.01); *F21W 2131/308* (2013.01)

(58) Field of Classification Search
  CPC .... A01K 5/029; A01K 5/0275; A01K 5/0283; A01K 63/00; A01K 63/06; A01K 63/63–065
  See application file for complete search history.

(56) References Cited

U.S. PATENT DOCUMENTS

| | | | | |
|---|---|---|---|---|
| 2,776,642 A | * | 1/1957 | Sepersky | A01K 63/006 D30/107 |
| 3,416,497 A | * | 12/1968 | Riel | A01K 61/85 119/51.11 |
| 3,605,697 A | | 9/1971 | Szekely | |
| 3,638,795 A | * | 2/1972 | Feddern | A01K 63/06 210/167.25 |
| 4,094,271 A | * | 6/1978 | Louis | A01K 63/006 206/820 |
| 4,151,810 A | * | 5/1979 | Wiggins | A01K 63/065 119/262 |
| 4,773,008 A | * | 9/1988 | Schroeder | G05B 19/0426 119/245 |
| 4,807,565 A | * | 2/1989 | Hawthorne | A01K 63/045 119/262 |
| 5,220,881 A | * | 6/1993 | Sandor, Jr. | A01K 63/042 119/265 |
| 5,713,304 A | * | 2/1998 | de Vosjoli | A01K 63/003 119/501 |
| 5,799,614 A | * | 9/1998 | Greenwood | A01K 63/003 119/452 |
| D423,146 S | | 4/2000 | Wang | |

(Continued)

FOREIGN PATENT DOCUMENTS

WO WO2017015359 1/2017

*Primary Examiner* — Ebony E Evans

(57) ABSTRACT

An automated terrarium feeder assembly includes a cover that is longitudinally elongated thereby facilitating the cover to be positioned on top of a terrarium to inhibit a reptile contained in the terrarium from escaping. A feeder is movably integrated into the cover to release a pre-determined amount of the reptile food into the terrarium to feed the reptile while an owner of the reptile is not present for extended periods of time. A heat lamp is integrated into the cover to warm the reptile. A light emitter is integrated into the cover to illuminate the terrarium. A touch screen is attached to the cover and the touch screen is in communication with the feeder for programming operational parameters of the feeder, the heat lamp, the light emitter and the blower.

10 Claims, 6 Drawing Sheets

(56) References Cited

U.S. PATENT DOCUMENTS

| | | | |
|---|---|---|---|
| 7,436,134 B2 * | 10/2008 | Levine | A01K 63/06 |
| | | | 315/363 |
| 7,886,696 B2 | 2/2011 | Marks | |
| 11,006,585 B2 | 5/2021 | Croteau | |
| 2003/0150394 A1 | 8/2003 | Wolfe | |
| 2018/0192621 A1 | 7/2018 | Valatka | |

* cited by examiner

AUTOMATED TERRARIUM FEEDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to automated feeder devices and more particularly pertains to a new automated feeder device for automatically caring for a reptile in a terrarium. The device includes a cover and a feeder movably integrated into the cover for dispensing food at regularly scheduled intervals. The device includes a heat lamp integrated into the cover for heating the terrarium and a light emitter integrated into the cover for illuminating the terrarium. The device includes a touch screen integrated into the cover that is in operational communication with the feeder, the heat lamp and the light emitter for programming operational parameters of the feeder, the heat lamp and the light emitter.

(2) Description of Related Art Including Information Disclosed Under 37 CFR 1.97 and 1.98

The prior art relates to automated feeder devices including an automatic feeder for aquariums that includes a feed hopper that is mounted to an aquarium and an analog timer for releasing a predetermined amount of feed from the feed hopper. The prior art discloses a reptilian environmental control device that includes an air conditioning unit and a humidification control unit. The prior art discloses a closed top aquarium that includes a lighting system, a timer and a heater for warming water in the aquarium. The prior art discloses an automated terrarium that includes a cylindrical housing, a lighting unit and an irrigation unit. The prior art discloses an automated vivarium that includes an enclosure and an environmental unit for maintaining environmental conditions found in a natural rainforest. The prior art discloses an automated habitat control system that is in wireless communication with a personal electronic device.

BRIEF SUMMARY OF THE INVENTION

An embodiment of the disclosure meets the needs presented above by generally comprising a cover that is longitudinally elongated thereby facilitating the cover to be positioned on top of a terrarium to inhibit a reptile contained in the terrarium from escaping. A feeder is movably integrated into the cover to release a pre-determined amount of the reptile food into the terrarium to feed the reptile while an owner of the reptile is not present for extended periods of time. A heat lamp is integrated into the cover to warm the reptile. A light emitter is integrated into the cover to illuminate the terrarium. A touch screen is attached to the cover and the touch screen is in communication with the feeder for programming operational parameters of the feeder, the heat lamp, the light emitter and the blower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
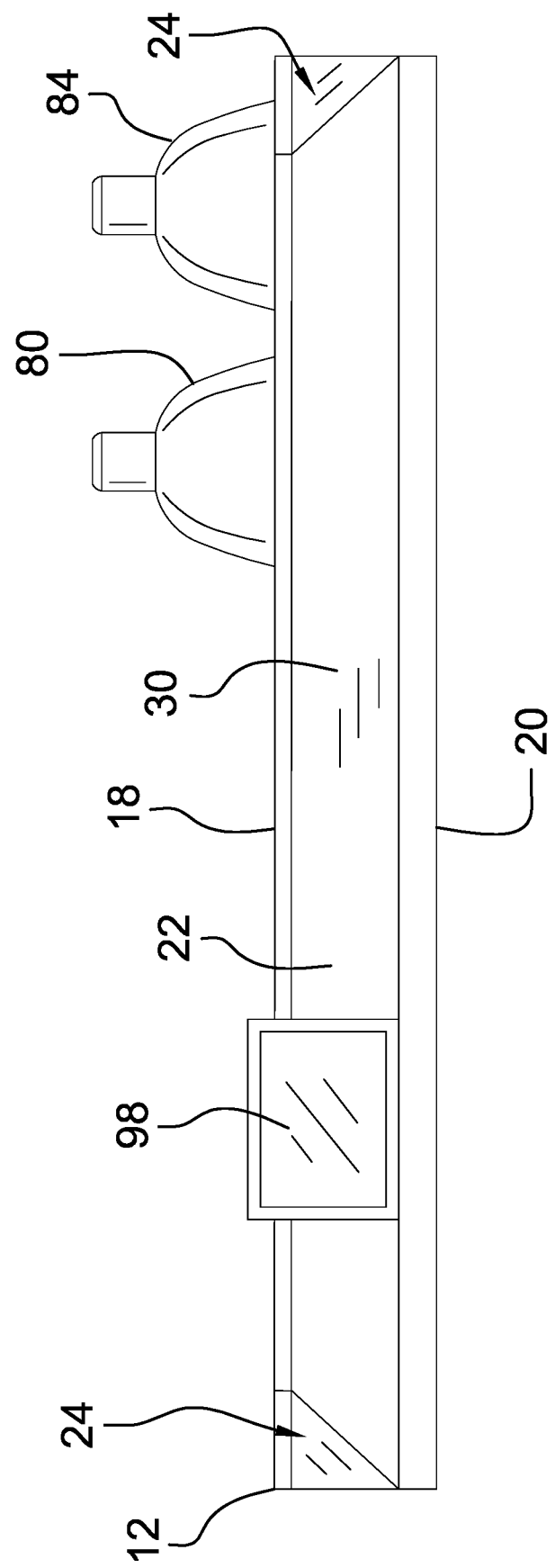
FIG. 1 is a front view of an automated terrarium feeder assembly according to an embodiment of the disclosure.
Figure 2:
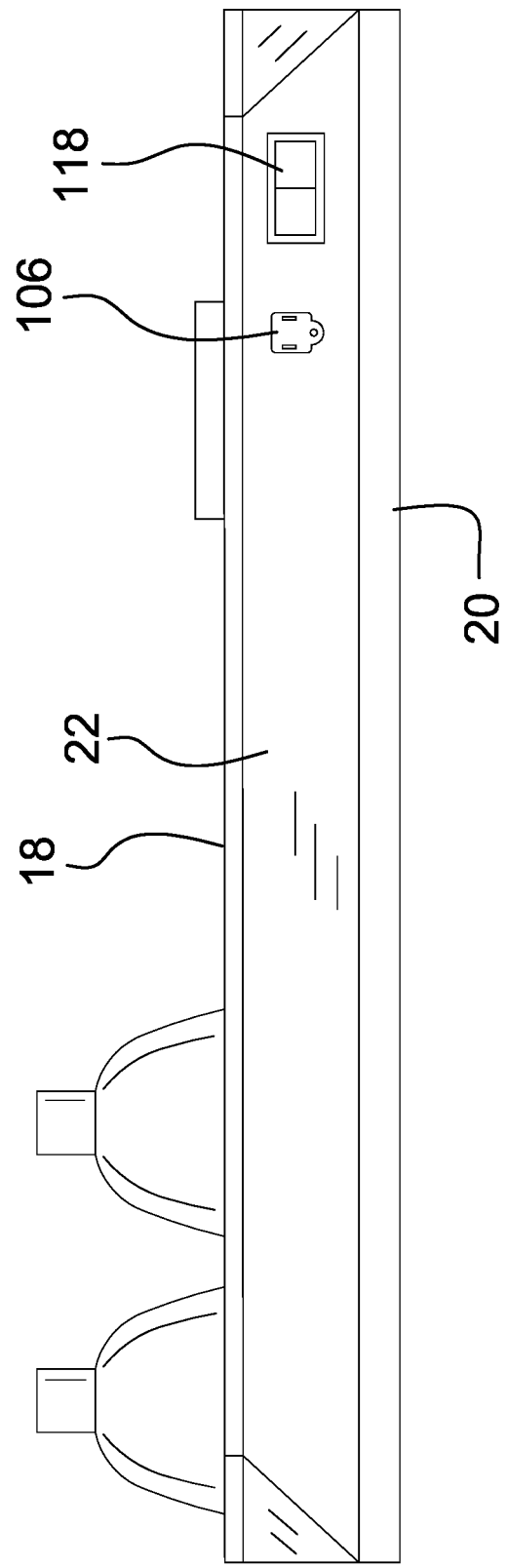
FIG. 2 is a back view of an embodiment of the disclosure.
Figure 3:
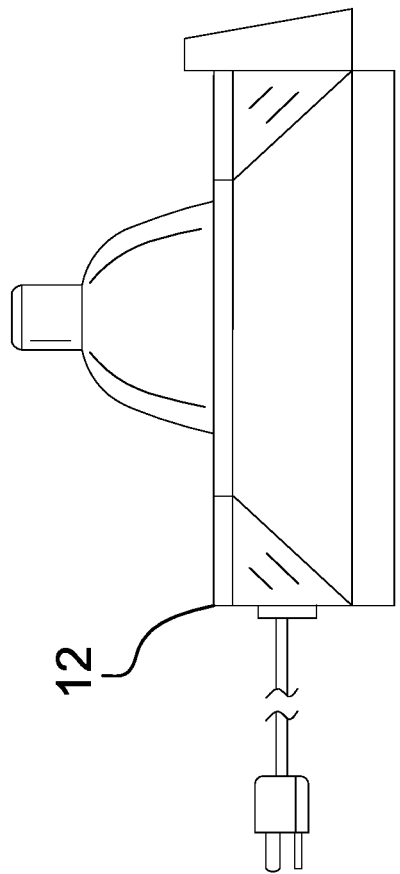
FIG. 3 is a right side view of an embodiment of the disclosure.
Figure 4:
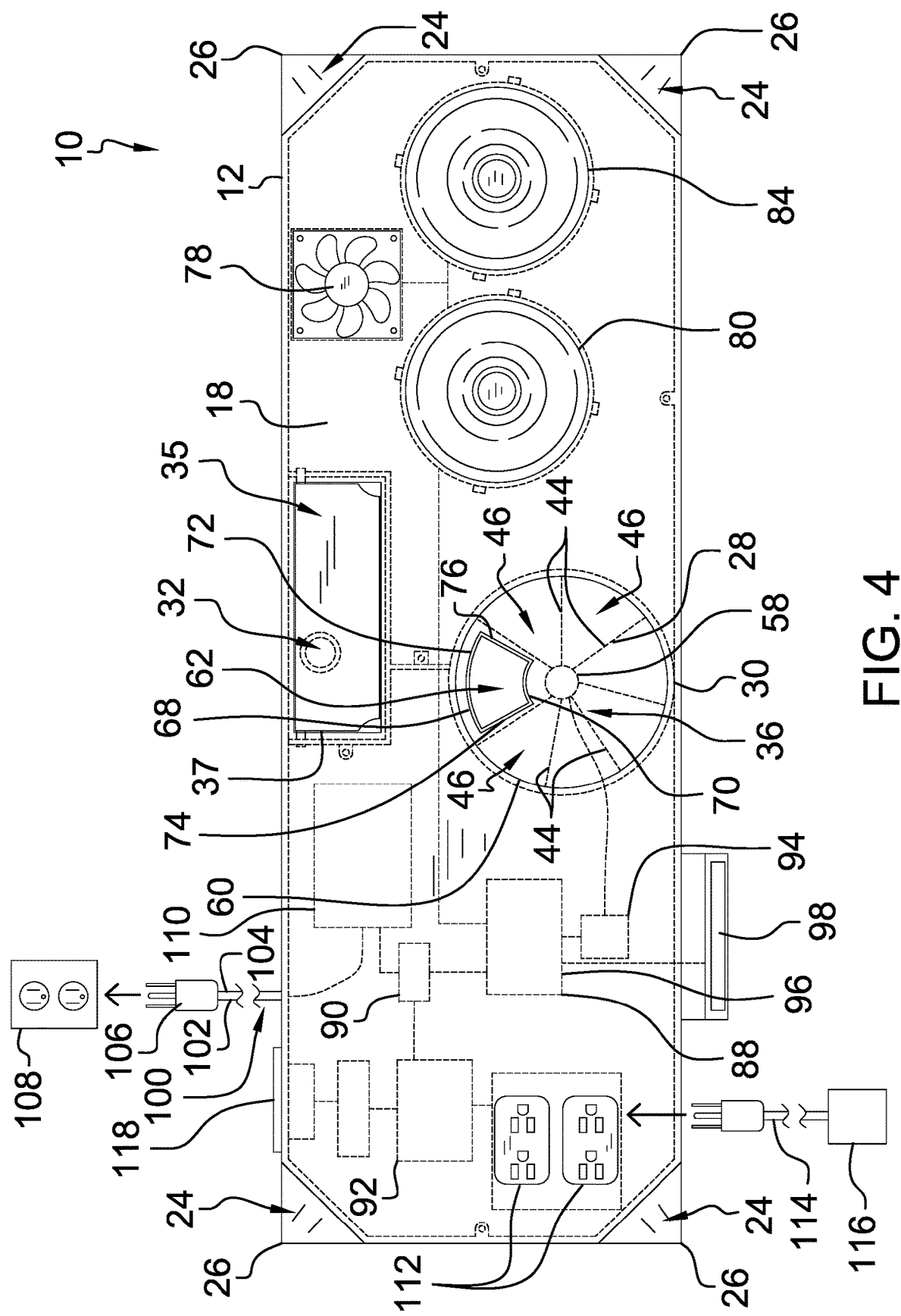
FIG. 4 is a top phantom view of an embodiment of the disclosure.
Figure 5:
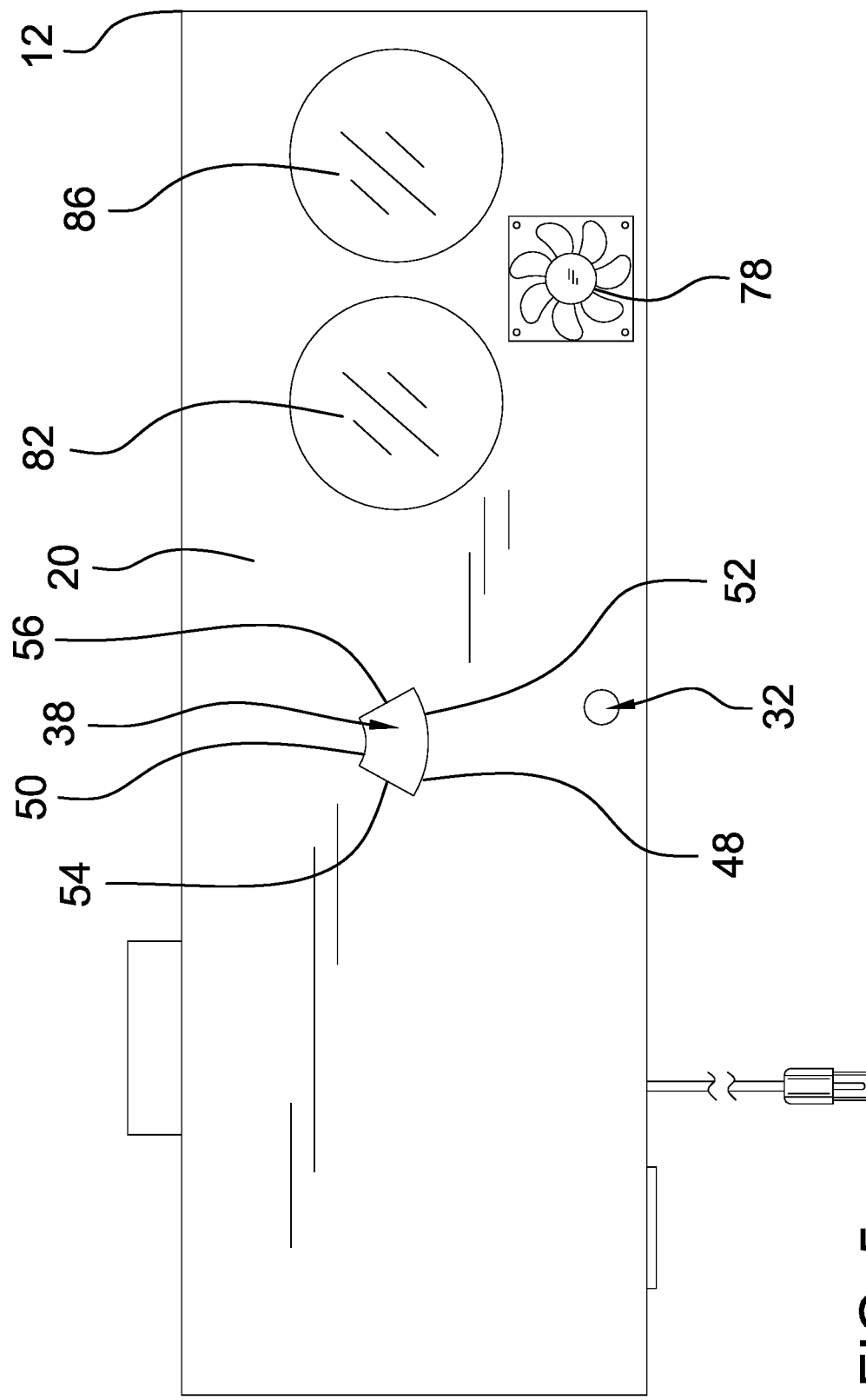
FIG. 5 is a bottom view of an embodiment of the disclosure.
Figure 6:
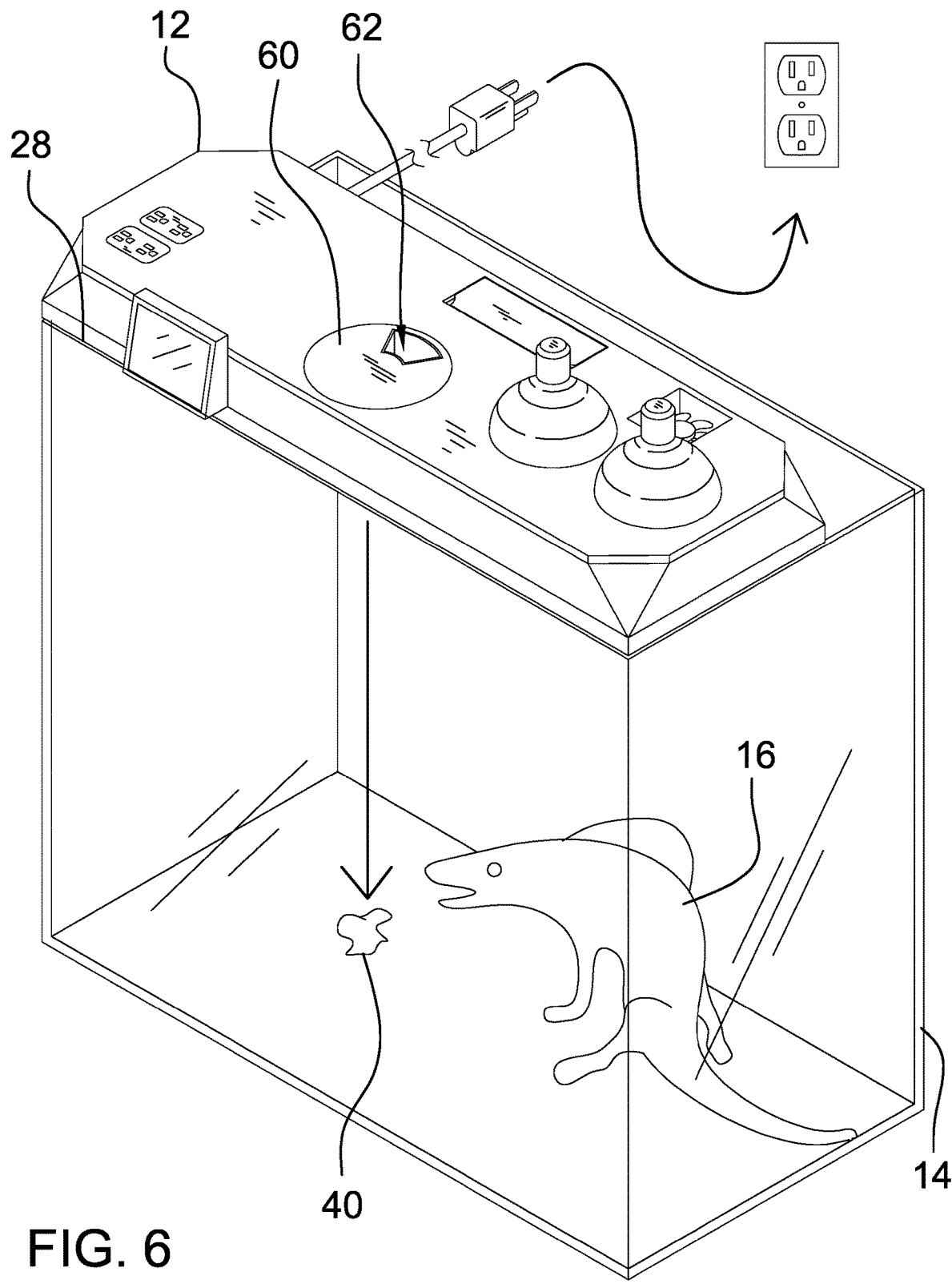
FIG. 6 is a perspective in-use view of an embodiment of the disclosure.

With reference now to the drawings, and in particular to FIGS. 1 through 6 thereof, a new automated feeder device embodying the principles and concepts of an embodiment of the disclosure and generally designated by the reference numeral 10 will be described.

As best illustrated in FIGS. 1 through 6, the automated terrarium feeder assembly 10 generally comprises a cover 12 that is longitudinally elongated thereby facilitating the cover 12 to be positioned on top of a terrarium 14 to inhibit a reptile 16 contained in the terrarium 14 from escaping. The reptile 16 may be a bearded dragon, for example, or other reptile commonly kept as a pet. The cover 12 has a top wall 18, a bottom wall 20 and a perimeter wall 22 extending between the top wall 18 and the bottom wall 20 and the perimeter wall 22 has a plurality of sloped portions 24 each sloping downwardly between the top wall 18 and the bottom wall 20. Each of the sloped portions 24 is aligned with a respective one of four corners 26 of the perimeter wall 22 and each of the sloped portions 24 tapers to a point between the top wall 18 and the bottom wall 20.

The bottom wall 20 rests on a top edge 27 of the terrarium 14 when the cover 12 is positioned on the terrarium 14 and the cover 12 is substantially hollow. The cover 12 wall has a feeder hole 28 extending through the top wall 18 and into an interior of the cover 12 and the feeder hole 28 is positioned adjacent to a front side 30 of the perimeter wall 22. The cover 12 has a wire conduit 32 extending through the top wall 18 and the bottom wall 20 thereby facilitating a wire of a sensor to be extended through the wire conduit 32. Additionally, the cover 12 has a blower conduit 34 extending through the top wall 18 and the bottom wall 20. Additionally, the cover 12 has a wire storage well 35 recessed into the top wall 18 of the cover 12 into which wires can be stored and the wire conduit 32 extends through the wire storage well 35. A wire lid 37 is hingedly disposed on the top wall 18 of the cover 12 and the wire lid 37 is aligned with the wire storage well 35 for opening and closing the wire storage well 35 A feeder 36 is movably integrated into the cover 12 and the feeder 36 includes an outlet port 38 for dispensing reptile food 40. The feeder 36 is actuated to release a pre-determined amount of the reptile food 40 through the outlet port 38 at pre-determined durations of time to automatically feed the reptile 16. In this way the feeder 36 can feed the reptile 16 while an owner of the reptile 16 is not present for extended periods of time. The feeder 36 includes a carousel 42 that is rotatably positioned between the top wall 18 and the bottom wall 20. The carousel 42 has a plurality of divider walls 44 that is arranged to radiate outwardly from the center of the carousel 42 to define a plurality of feed spaces 46 between a respective pair of the divider walls 44. The carousel 42 is aligned with the feeder hole 28 in the top wall 18 thereby facilitating each of the feed spaces 46 to be filled with the reptile food 40.

The outlet port 38 extends through the bottom wall 20 of the cover 12 and the outlet port 38 has a bounding edge 48. The bounding edge 48 of the outlet port 38 has a forward side 50, a rear side 52, a first sidelong side 54 and a second sidelong side 56. Each of the forward side 50 and the rear side 52 is curved having each of the forward side 50 and the rear side 52 being co-arcuate with each other. Additionally, each of the first sidelong side 54 and the second sidelong side 56 angles outwardly between the forward side 50 and the rear side 52 such that the outlet port 38 defines a segment of a donut shape. A carousel motor 58 is integrated into the carousel 42 and the carousel motor 58 rotates the carousel 42 a predetermined angle of rotation when the carousel motor 58 is turned on for aligning a respective one of the feed spaces 46 with the outlet port 38. In this way the reptile food 40 in the respective feed space 46 can fall through the outlet port 38 and into the terrarium 14. The carousel motor 58 may comprise an electric motor or the like.

A lid 60 is positionable in the feeder hole 28 in the top wall 18 of the cover 12 and the lid 60 has an inlet port 62 extending through a top side 64 and a bottom side 66 of the lid 60. The inlet port 62 has a bounding edge 68 and the bounding edge 68 has a front side 70, a back side 72, a first lateral side 74 and a second lateral side 76. Each of the front side 70 and the back side 72 is curved having each of the front side 70 and the back side 72 being co-arcuate with each other. Each of the first lateral side 74 and the second lateral side 76 angles outwardly between the front side 70 and the back side 72 such that the inlet port 62 defines a segment of a donut shape. A respective one of the feed spaces 46 in the carousel 42 is aligned with the inlet port 62 each time the carousel 42 is rotated thereby facilitating the respective feed space 46 to be filled with the reptile food 40. Additionally, the lid 60 is positioned in the feeder hole 28 such that the inlet port 62 is offset from the outlet port 38.

A blower 78 is integrated into the cover 12 thereby facilitating the blower 78 to urge air into the terrarium 14 when the blower 78 is turned on. The blower 78 is positioned in the blower conduit 34 such that the blower 78 urges air inwardly through the top wall 18 and outwardly through the bottom wall 20 when the blower 78 is turned on. The blower 78 may include an electric motor and a plurality of blades that are rotated by the blower 78 for urging air in the convention of a fan.

A heat lamp 80 is integrated into the cover 12 and the heat lamp 80 emits thermal radiation when the heat lamp 80 is turned on to warm the reptile 16. The heat lamp 80 is positioned on the top wall 18 of the cover 12 and the heat lamp 80 has an emitter 82 that is aligned with the bottom wall 20 of the cover 12. The heat lamp 80 may comprise an infrared light emitter or other type of electronic heat lamp. A light emitter 84 is integrated into the cover 12 and the light emitter 84 emits light when the light emitter 84 is turned on to illuminate the terrarium 14. The light emitter 84 is positioned on the top wall 18 of the cover 12 and the light emitter 84 has an emitter 86 that is aligned with the bottom wall 20 of the cover 12. The light emitter 84 may comprise a light emitting diode, an incandescent light bulb or any other type of electronic light emitter.

A control circuit 88 is integrated into the cover 12 and the control circuit 88 is electrically coupled to the carousel motor 58. The control circuit 88 is electrically coupled to the heat lamp 80, the control circuit 88 is electrically coupled to the light emitter 84 and the control circuit 88 is electrically coupled to the blower 78. The control circuit 88 may include a buck converter 90, a channel relay 92, a motor controller 94 for the carousel motor 58, and a Raspberry Pi 96 integrated circuit manufactured by Raspberry Pi Foundation, Maurice Wilkes Building, St. John's Innovation Park, Cowley road, Cambridge England, CB4 ODS. A touch screen 98 is attached to the cover 12 and the touch screen 98 is in communication with the feeder 36 for programming operational parameters of the feeder 36, the heat lamp 80, the light emitter 84, and the blower 78. The touch screen 98 is electrically coupled to the control circuit 88 and the touch screen 98 displays indicia comprising a menu for navigating controls for the carousel motor 58 and the heat lamp 80 and the light emitter 84 and the blower 78.

A power supply 100 is integrated into the cover 12 and the power supply 100 is electrically coupled to the control circuit 88. The power supply 100 comprises a power cord 102 that extends away from the perimeter wall 22 of the cover 12. The power cord 102 has a distal end 104 with respect to the perimeter wall 22 and a male plug 106 is electrically coupled to the distal end 104. The male plug 106 is pluggable into a power source 108 comprising a female electrical outlet. The power supply 100 includes a transformer 110 that is integrated into the cover 12 and the transformer 110 is electrically coupled to the power cord 102. The transformer 110 is electrically coupled to the control circuit 88 and the transformer 110 transforms electrical current from the power source 108 into an electrical current appropriate to power the control circuit 88.

The power supply 100 includes a plurality of female electrical outlets 112 and each of the female electrical outlets 112 is integrated into the top wall 18 of the cover 12 thereby facilitating each of the female electrical outlets 112 to receive a power cord 114 of an electronic device 116. Each of the female electrical outlets 112 is electrically coupled to the power cord 102 thereby facilitating the female electrical outlets 112 to supply electrical power to the electronic device 116. The power supply 100 includes a power switch 118 that is movably integrated into the perimeter wall 22 of the cover 12. The power switch 118 is electrically coupled to the control circuit 88 and the power switch 118 turns the control circuit 88 on and off.

In use, the cover 12 is positioned on the terrarium 14, the lid 60 is removed from the cover 12, the reptile food 40 is deposited into each of the feed spaces 46 in the carousel 42 and the lid 60 is replaced on the cover 12. The touch screen 98 is manipulated to program the feeding schedule for the feeder 36 as well as to program the time and duration for each of the heat lamp 80 and the light emitter 84 to be turned on and off. In this way the reptile 16 can be cared for while an owner of the reptile 16 is on vacation, for example. Reptile food 40 can be dropped through the inlet port 62 in the lid 60 to fill the feed space 46 that is located beneath the inlet port 62 to be filled with the reptile food 40. A temperature sensor, for example, can be routed through the wire conduit 32 in the cover 12 to facilitate the temperature in the terrarium 14 to be monitored.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated terrarium feeder assembly for automatically feeding an animal being kept in a terrarium, said assembly comprising:
    a cover being longitudinally elongated thereby facilitating said cover to be positioned on top of a terrarium wherein said cover is configured to inhibit a reptile contained in the terrarium from escaping;
    a feeder being movably integrated into said cover, said feeder having an outlet port for dispensing the reptile food, said feeder being actuated to release a pre-determined amount of the reptile food through said outlet port at pre-determined durations of time to automatically feed the reptile wherein said feeder is configured to feed the reptile while an owner of the reptile is not present for extended periods of time;
    a heat lamp being integrated into said cover, said heat lamp emitting thermal radiation when said heat lamp is turned on wherein said heat lamp is configured to warm the reptile;
    a light emitter being integrated into said cover, said light emitter emitting light when said light emitter is turned on wherein said light emitter is configured to illuminate the terrarium; and
    a touch screen being attached to said cover, said touch screen being in communication with said feeder for programming operational parameters of said feeder and said heat lamp and said light emitter and a blower integrated into said cover for facilitating said blower to urge air into the terrarium when said blower is turned on.

2. The assembly according to claim 1, wherein:
    said cover has a top wall, a bottom wall and a perimeter wall extending between said top wall and said bottom wall, said perimeter wall having a plurality of sloped portions each sloping downwardly between said top wall and said bottom wall, each of said sloped portions being aligned with a respective one of four corners of said perimeter wall, each of said sloped portions tapering to a point between said top wall and said bottom wall;
    said bottom wall rests on a top edge of the terrarium when said cover is positioned on the terrarium;
    said cover is substantially hollow;
    said cover has a feeder hole extending through said top wall and into an interior of said cover, said feeder hole being positioned adjacent to a front wall of said cover;
    said cover has a wire conduit extending through said top wall and said bottom wall thereby facilitating a wire of a sensor to be extended through said wire conduit; and
    said cover has a blower conduit extending through said top wall and said bottom wall.

3. The assembly according to claim 2, wherein said feeder includes a carousel being rotatably positioned between said top wall and said bottom wall, said carousel having a plurality of divider walls being arranged to radiate outwardly from said center of said carousel to define a plurality of feed spaces between a respective pair of said divider walls, said carousel being aligned with said feeder hole in said top wall thereby facilitating each feed space of said plurality of feed spaces to be filled with the reptile food.

4. The assembly according to claim 3, wherein:
    said outlet port extends through said bottom wall of said cover, said outlet port having a bounding edge, said bounding edge of said outlet port having a forward side, a rear side, a first sidelong side and a second sidelong side, each of said forward side and said rear side being curved having each of said forward side and said rear side being co-arcuate with each other, each of said first sidelong side and said second sidelong side angling outwardly between said forward side and said rear side such that said outlet port defines a segment of an annular shape; and
    said assembly includes a carousel motor being integrated into said carousel, said carousel motor rotating said carousel a predetermined angle of rotation when said carousel motor is turned on for aligning a respective one of said feed spaces of said plurality of feed spaces with said outlet port thereby facilitating the reptile food in said respective feed space of said plurality of feed spaces to fall through said outlet port and into the terrarium.

5. The assembly according to claim 3, wherein:
said assembly includes a lid being positionable in said feeder hole in said top wall of said cover, said lid having an inlet port extending through a top side and a bottom side of said lid, said inlet port having a bounding edge, said bounding edge having a front side, a back side, a first lateral side and a second lateral side, each of said front side and said back side being curved having each of said front side and said back side being co-arcuate with each other, each of said first lateral side and said second lateral side angling outwardly between said front side and said back side such that said inlet port defines a segment of an annular shape;
a respective one feed space of said plurality of feed spaces in said carousel being aligned with said inlet port each time said carousel is rotated thereby facilitating said respective one feed space of said plurality of feed spaces to be filled with the reptile food; and
said lid is positioned in said feeder hole such that said inlet port is offset from said outlet port.

6. The assembly according to claim 2, further comprising said blower being positioned in said blower conduit such that said blower urges air inwardly through said top wall and outwardly through said bottom wall when said blower is turned on.

7. The assembly according to claim 2, wherein:
said heat lamp is positioned on said top wall of said cover, said heat lamp having an emitter being aligned with said bottom wall of said cover; and
said light emitter is positioned on said top wall of said cover, said light emitter having an emitter being aligned with said bottom wall of said cover.

8. The assembly according to claim 1, wherein:
said assembly includes a blower being integrated into said cover;
said assembly includes a carousel motor being integrated into said feeder;
said assembly includes a control circuit being integrated into said cover, said control circuit being electrically coupled to said carousel motor, said control circuit being electrically coupled to said heat lamp, said control circuit being electrically coupled to said light emitter, said control circuit being electrically coupled to said blower; and
said touch screen is electrically coupled to said control circuit, said touch screen displaying indicia comprising a menu for navigating controls for said carousel motor and said heat lamp and said light emitter and said blower.

9. The assembly according to claim 8, further comprising a power supply being integrated into said cover, said power supply being electrically coupled to said control circuit, said power supply comprising:
a power cord extending away from a perimeter wall of said cover, said power cord having a distal end with respect to said perimeter wall, said power cord having a male plug being electrically coupled to said distal end, said male plug being pluggable into a power source comprising a female electrical outlet;
a transformer being integrated into said cover, said transformer being electrically coupled to said power cord, said transformer being electrically coupled to said control circuit, said transformer transforming electrical current from said power source into an electrical current appropriate to power said control circuit;
a plurality of female electrical outlets, each of said female electrical outlets being integrated into a top wall of said cover thereby facilitating each of said female electrical outlets to receive a power cord of an electronic device, each of said female electrical outlets being electrically coupled to said power cord thereby facilitating said female electrical outlets to supply electrical power to the electronic device; and
a power switch being movably integrated into said perimeter wall of said cover, said power switch being electrically coupled to said control circuit, said power switch turning said control circuit on and off.

10. An automated terrarium feeder assembly for automatically feeding an animal being kept in a terrarium, said assembly comprising:
a cover being longitudinally elongated thereby facilitating said cover to be positioned on top of a terrarium wherein said cover is configured to inhibit a reptile contained in the terrarium from escaping, said cover having a top wall, a bottom wall and a perimeter wall extending between said top wall and said bottom wall, said perimeter wall having a plurality of sloped portions each sloping downwardly between said top wall and said bottom wall, each of said sloped portions being aligned with a respective one of four corners of said perimeter wall, each of said sloped portions tapering to a point between said top wall and said bottom wall, said bottom wall resting on a top edge of the terrarium when said cover is positioned on the terrarium, said cover being substantially hollow, said cover having a feeder hole extending through said top wall and into an interior of said cover, said feeder hole being positioned adjacent to a front wall of said cover, said cover having a wire conduit extending through said top wall and said bottom wall thereby facilitating a wire of a sensor to be extended through said wire conduit, said cover having a blower conduit extending through said top wall and said bottom wall;
a feeder being movably integrated into said cover, said feeder including an outlet port for dispensing the reptile food, said feeder being actuated to release a pre-determined amount of the reptile food through said outlet port at pre-determined durations of time to automatically feed the reptile wherein said feeder is configured to feed the reptile while an owner of the reptile is not present for extended periods of time, said feeder including a carousel being rotatably positioned between said top wall and said bottom wall, said carousel having a plurality of divider walls being arranged to radiate outwardly from a center of said carousel to define a plurality of feed spaces between a respective pair of said divider walls, said carousel being aligned with said feeder hole in said top wall thereby facilitating each feed space of said plurality of feed spaces to be filled with the reptile food, said outlet port extending through said bottom wall of said cover, said outlet port having a bounding edge, said bounding edge of said outlet port having a forward side, a rear side, a first sidelong side and a second sidelong side, each of said forward side and said rear side being curved having each of said forward side and said rear side being co-arcuate with each other, each of said first sidelong side and said second sidelong side angling outwardly between said forward side and said rear side such that said outlet port defines a segment of an annular shape;
a carousel motor being integrated into said carousel, said carousel motor rotating said carousel a predetermined angle of rotation when said carousel motor is turned on for aligning a respective one of said feed spaces of said plurality of feed spaces with said outlet port thereby facilitating the reptile food in said respective feed space of said plurality of feed spaces to fall through said outlet port and into the terrarium;

a lid being positionable in said feeder hole in said top wall of said cover, said lid having an inlet port extending through a top side and a bottom side of said lid, said inlet port having a bounding edge, said bounding edge having a front side, a back side, a first lateral side and a second lateral side, each of said front side and said back side being curved having each of said front side and said back side being co-arcuate with each other, each of said first lateral side and said second lateral side angling outwardly between said front side and said back side such that said inlet port defines a segment of an annular shape, a respective one feed space of said plurality of feed spaces in said carousel being aligned with said inlet port each time said carousel is rotated thereby facilitating said respective one feed space of said plurality of feed spaces to be filled with the reptile food, said lid being positioned in said feeder hole such that said inlet port is offset from said outlet port;

a blower being integrated into said cover thereby facilitating said blower to urge air into the terrarium when said blower is turned on, said blower being positioned in said blower conduit such that said blower urges air inwardly through said top wall and outwardly through said bottom wall when said blower is turned on;

a heat lamp being integrated into said cover, said heat lamp emitting thermal radiation when said heat lamp is turned on wherein said heat lamp is configured to warm the reptile, said heat lamp being positioned on said top wall of said cover, said heat lamp having an emitter being aligned with said bottom wall of said cover;

a light emitter being integrated into said cover, said light emitter emitting light when said light emitter is turned on wherein said light emitter is configured to illuminate the terrarium, said light emitter being positioned on said top wall of said cover, said light emitter having an emitter being aligned with said bottom wall of said cover;

a control circuit being integrated into said cover, said control circuit being electrically coupled to said carousel motor, said control circuit being electrically coupled to said heat lamp, said control circuit being electrically coupled to said light emitter, said control circuit being electrically coupled to said blower;

a touch screen being attached to said cover, said touch screen being in communication with said feeder for programming operational parameters of said feeder and said heat lamp and said light emitter and said blower, said touch screen being electrically coupled to said control circuit, said touch screen displaying indicia comprising a menu for navigating controls for said carousel motor and said heat lamp and said light emitter and said blower; and a power supply being integrated into said cover, said power supply being electrically coupled to said control circuit, said power supply comprising:

a power cord extending away from said perimeter wall of said cover, said power cord having a distal end with respect to said perimeter wall, said power cord having a male plug being electrically coupled to said distal end, said male plug being pluggable into a power source comprising a female electrical outlet;

a transformer being integrated into said cover, said transformer being electrically coupled to said power cord, said transformer being electrically coupled to said control circuit, said transformer transforming electrical current from said power source into an electrical current appropriate to power said control circuit;

a plurality of female electrical outlets, each of said female electrical outlets being integrated into said top wall of said cover thereby facilitating each of said female electrical outlets to receive a power cord of an electronic device, each of said female electrical outlets being electrically coupled to said power cord thereby facilitating said female electrical outlets to supply electrical power to the electronic device; and a power switch being movably integrated into said perimeter wall of said cover, said power switch being electrically coupled to said control circuit, said power switch turning said control circuit on and off.

* * * * *